(12) United States Patent
Viola et al.

(10) Patent No.: US 11,466,631 B2
(45) Date of Patent: *Oct. 11, 2022

(54) METHOD AND SYSTEM FOR CONTROLLING AN ON-VEHICLE EVAPORATIVE EMISSION SYSTEM

(71) Applicant: GM GLOBAL TECHNOLOGY OPERATIONS LLC, Detroit, MI (US)

(72) Inventors: Michael B. Viola, Macomb Township, MI (US); Darrell W. Burleigh, Fenton, MI (US); Timothy E. McCarthy, Grand Blanc, MI (US); Anne M. Dailly, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,669

(22) Filed: Feb. 16, 2021

(65) Prior Publication Data

US 2022/0260027 A1    Aug. 18, 2022

(51) Int. Cl.
*F02M 1/00* (2006.01)
*F02D 41/00* (2006.01)
(Continued)

(52) U.S. Cl.
CPC ..... *F02D 41/0077* (2013.01); *B01D 53/0415* (2013.01); *B01D 53/0438* (2013.01);
(Continued)

(58) Field of Classification Search
CPC .. F02M 25/0854; F02M 25/089; F02M 25/08; F02M 35/10281; F02M 2025/0863; F02M 33/02
See application file for complete search history.

(56) References Cited

U.S. PATENT DOCUMENTS 4,403,587 A    9/1983   Mizuno et al.
5,347,971 A    9/1994   Kobayashi et al.
(Continued)

FOREIGN PATENT DOCUMENTS

WO    2010144360 A2    12/2010

OTHER PUBLICATIONS

Schneeman, Bon, Schwedler; Senkovska, Kaskel, Fischer; Flexible metal-organic frameworks;Royal Society of Chemistry 2014, 43, 6062-6096.

*Primary Examiner* — John Kwon
(74) *Attorney, Agent, or Firm* — Quinn IP Law (57) ABSTRACT

A vehicle system having an internal combustion engine and evaporative emission system including a canister is described, wherein canister includes a chamber having a flexible Metal Organic Framework (MOF) material disposed therein. A controllable device is coupled to the flexible MOF material, and a controller is operatively connected to the controllable device and the purge valve. The controller includes an instruction set that is executable to activate the controllable device and control the purge valve to an open state in response to a command to purge the canister, determine an activation parameter for the controllable device, determine a purge flow, integrate the purge flow to determine a total purge mass, and deactivate the controllable device when the total purge mass is greater than a threshold.

20 Claims, 5 Drawing Sheets

(51) Int. Cl.
  *F02M 35/10*   (2006.01)
  *F02M 25/08*   (2006.01)
  *B01D 53/04*   (2006.01)
  *B01J 20/22*   (2006.01)
  *B01J 20/28*   (2006.01)
  *H05B 3/00*    (2006.01)
  *F02D 41/22*   (2006.01)

(52) U.S. Cl.
  CPC ..... *B01D 53/0446* (2013.01); *B01D 53/0454* (2013.01); *B01J 20/226* (2013.01); *B01J 20/28083* (2013.01); *F02D 41/0072* (2013.01); *F02M 25/0809* (2013.01); *F02M 25/0836* (2013.01); *F02M 25/0854* (2013.01); *F02M 35/10222* (2013.01); *H05B 3/0014* (2013.01); *B01D 2253/204* (2013.01); *B01D 2257/702* (2013.01); *B01D 2259/4009* (2013.01); *B01J 2220/46* (2013.01); *B01J 2220/66* (2013.01); *F02D 2041/0067* (2013.01); *F02D 2041/224* (2013.01); *F02M 2025/0881* (2013.01); *H05B 2203/02* (2013.01)

(56) References Cited

U.S. PATENT DOCUMENTS

| | | | |
|---|---|---|---|
| 7,553,352 | B2 | 6/2009 | Mueller et al. |
| 7,753,034 | B2 | 7/2010 | Hoke et al. |
| 9,050,885 | B1 | 6/2015 | Dudar et al. |
| 10,138,846 | B1 | 11/2018 | Dudar |
| 10,174,728 | B2 * | 1/2019 | Yamauchi ............... F02M 25/08 |
| 10,378,462 | B1 * | 8/2019 | Hamad ............... F02D 41/0025 |
| 10,704,501 | B2 * | 7/2020 | Byrne ................ F02M 25/0854 |
| 11,230,997 | B1 * | 1/2022 | Viola ............... F02M 35/10281 |
| 2002/0059920 | A1 | 5/2002 | Yoshioka et al. |
| 2004/0211320 | A1 | 10/2004 | Cain |
| 2012/0024158 | A1 | 2/2012 | Makino et al. |
| 2014/0076286 | A1 | 3/2014 | Karim et al. |
| 2014/0290611 | A1 * | 10/2014 | Abd Elhamid ....... F17C 11/007 48/127.3 |
| 2015/0158378 | A1 | 6/2015 | Dudar et al. |
| 2017/0023503 | A1 | 1/2017 | Rebinsky |
| 2017/0067415 | A1 * | 3/2017 | Cai .................... F02M 25/0854 |
| 2018/0363594 | A1 * | 12/2018 | Byrne ................ F02M 25/0854 |
| 2020/0147586 | A1 | 5/2020 | Ruettinger et al. |
| 2021/0317803 | A1 * | 10/2021 | Cronin ............... B01J 20/28011 |

\* cited by examiner

METHOD AND SYSTEM FOR CONTROLLING AN ON-VEHICLE EVAPORATIVE EMISSION SYSTEM

INTRODUCTION

A vehicle employing an internal combustion engine may emit volatile hydrocarbons from sources that may include an engine air intake system, a fuel delivery system, a fuel tank, and an exhaust gas recirculation (EGR) system. These emissions from the fuel tank and fuel delivery system may be captured employing an evaporative emissions control system that includes an evaporative emission canister ("canister") that is filled with activated carbon.

A canister can employ activated carbon to adsorb fuel vapor that is emitted from the fuel systems to limit evaporative emissions. The adsorbed fuel vapor is periodically removed from the activated carbon by purging the canister with fresh ambient air, desorbing the fuel vapor from the activated carbon and thereby regenerating the carbon for further adsorption of fuel vapor.

Stricter regulations on evaporative emissions continue to prompt development of improved evaporative emission control systems, particularly for use in vehicles with reduced purge volumes such as hybrid vehicles. Such vehicles may otherwise produce high evaporative emissions due to lower purge frequency, which equates to lower total purge volume and higher residual hydrocarbon heel. Accordingly, it is desirable to have an evaporative emission control system capable of effectively capturing evaporative emissions on vehicles having low purge volumes and/or infrequent purge cycles.

There is a need for an improved method, apparatus, and/or system for controlling and monitoring an evaporative emissions system that captures volatile hydrocarbons that may be emitted by an on-vehicle fuel tank.

SUMMARY

The concepts described herein provide for a system, apparatus and/or method for controlling and monitoring an on-vehicle evaporative emission control system that employs a canister having a flexible Metal Organic Framework (MOF) material disposed in the chamber.

In one embodiment, this includes a vehicle system having an internal combustion engine and evaporative emission system including a canister. The canister is arranged to capture fuel vapors from a fuel tank and is fluidly coupled via a purge valve to an intake portion of the internal combustion engine. The canister defines a chamber having a flexible Metal Organic Framework (MOF) material disposed therein. A controllable device is coupled to the flexible MOF material, and a controller is operatively connected to the controllable device and the purge valve. The controller includes an instruction set that is executable to activate the controllable device and control the purge valve to an open state in response to a command to purge the canister, determine an activation parameter for the controllable device, determine a purge flow, integrate the purge flow to determine a total purge mass, and deactivate the controllable device when the total purge mass is greater than a threshold.

Another aspect of the disclosure includes the controllable device being deactivated when the activation parameter for the controllable device is greater than a second threshold.

Another aspect of the disclosure includes the controllable device being a first heating element that is arranged proximal to the flexible MOF material, wherein activating the controllable device includes controlling the controllable device in a heat generating state.

Another aspect of the disclosure includes the flexible Metal Organic Framework (MOF) material disposed in the chamber of the canister being a hybrid organic-inorganic material that is assembled by connection of metal oxide clusters through rigid organic ligands, wherein the flexible MOF material is reversibly controllable in one of a first, collapsed state and a second, expanded state in response to a control stimulus, and wherein the control stimulus corresponds to the activation parameter for the controllable device.

Another aspect of the disclosure includes the first heating element being one of a positive temperature coefficient (PTC) heater, a thin film heater, or a rod heater.

Another aspect of the disclosure includes a second heating element arranged in a flow stream proximal to the air vent, which is activated in response to the command to purge the canister.

Another aspect of the disclosure includes the controller being operable to integrate the activation parameter to determine an integrated activation energy parameter for the controllable device to detect a fault associated with the controllable device when the integrated activation energy parameter for the controllable device is either greater than an upper threshold or less than a lower threshold.

Another aspect of the disclosure includes a sensing element that is arranged to monitor an element of the evaporative emission system and is in communication with the controller. The sensing element is monitored to detect a fault associated with the evaporative emission system.

Another aspect of the disclosure includes the sensing element being arranged to monitor an electrical circuit of the evaporative emission system to detect one of an open circuit or a short circuit in the electrical circuit of the evaporative emission system.

Another aspect of the disclosure includes the sensing element being arranged to monitor a position associated with the flexible Metal Organic Framework (MOF) material disposed in the canister to detect a fault in the flexible MOF material based upon the position.

Another aspect of the disclosure includes the sensing element being arranged to monitor a temperature associated with the flexible MOF material disposed in the canister to detect a fault in the flexible MOF material based upon the temperature.

Another aspect of the disclosure includes the sensing element being arranged to monitor a pressure associated with the flexible MOF material disposed in the canister to detect a fault in the flexible MOF material based upon the pressure.

Another aspect of the disclosure includes the sensing element being arranged to monitor a purge time associated with the evaporative emission system to detect a fault in the flexible MOF material based upon the purge time.

Another aspect of the disclosure includes a vehicle system having an internal combustion engine and evaporative emission system including a canister, wherein the canister arranged to capture fuel vapors from a fuel tank and fluidly coupled via a purge valve to an intake portion of the internal combustion engine. The canister defines a first chamber and a second chamber, with the first chamber and the second chamber being arranged in series between a vent valve and a purge valve. The first chamber has a first Metal Organic Framework (MOF) material and a first controllable device arranged therein, and the second chamber has a second MOF material and a second controllable device arranged therein.

A controller is operatively connected to the first controllable device, the second controllable device, and the purge valve, and includes an instruction set that is executable to activate the first controllable device, deactivate the second controllable device, and control the purge valve to an open state in response to a command to purge the canister. A first activation parameter is determined for the first controllable device. The first controllable device is deactivated, the second controllable device is activated, and the purge valve is controlled to the open state when the first activation parameter for the first controllable device is greater than a first threshold. A second activation parameter is determined for the second controllable device, and a purge flow is determined and integrated to determine a total purge mass. The second controllable device is deactivated when the total purge mass is greater than a threshold.

Another aspect of the disclosure includes a method for operating an evaporative emission system including a canister, wherein the canister is arranged to capture fuel vapors from a fuel tank and fluidly coupled via a purge valve to an intake portion of the internal combustion engine, wherein the canister defines a chamber having a flexible Metal Organic Framework (MOF) material disposed therein the chamber. The method includes controlling the purge valve to an open state in response to a command to purge the canister, activating a controllable device coupled to the flexible MOF material, determining an activation parameter for the controllable device, determining a purge flow, integrating the purge flow to determine a total purge mass, and deactivating the controllable device when the total purge mass is greater than a threshold.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. Furthermore, there is no intention to be bound by any expressed or implied theory presented in the preceding technical field, background, brief summary or the following detailed description. It should be understood that throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

As employed herein, the term "upstream" and related terms refer to elements that are towards an origination of a flow stream relative to an indicated location, and the term "downstream" and related terms refer to elements that are away from an origination of a flow stream relative to an indicated location.

Figure 1:
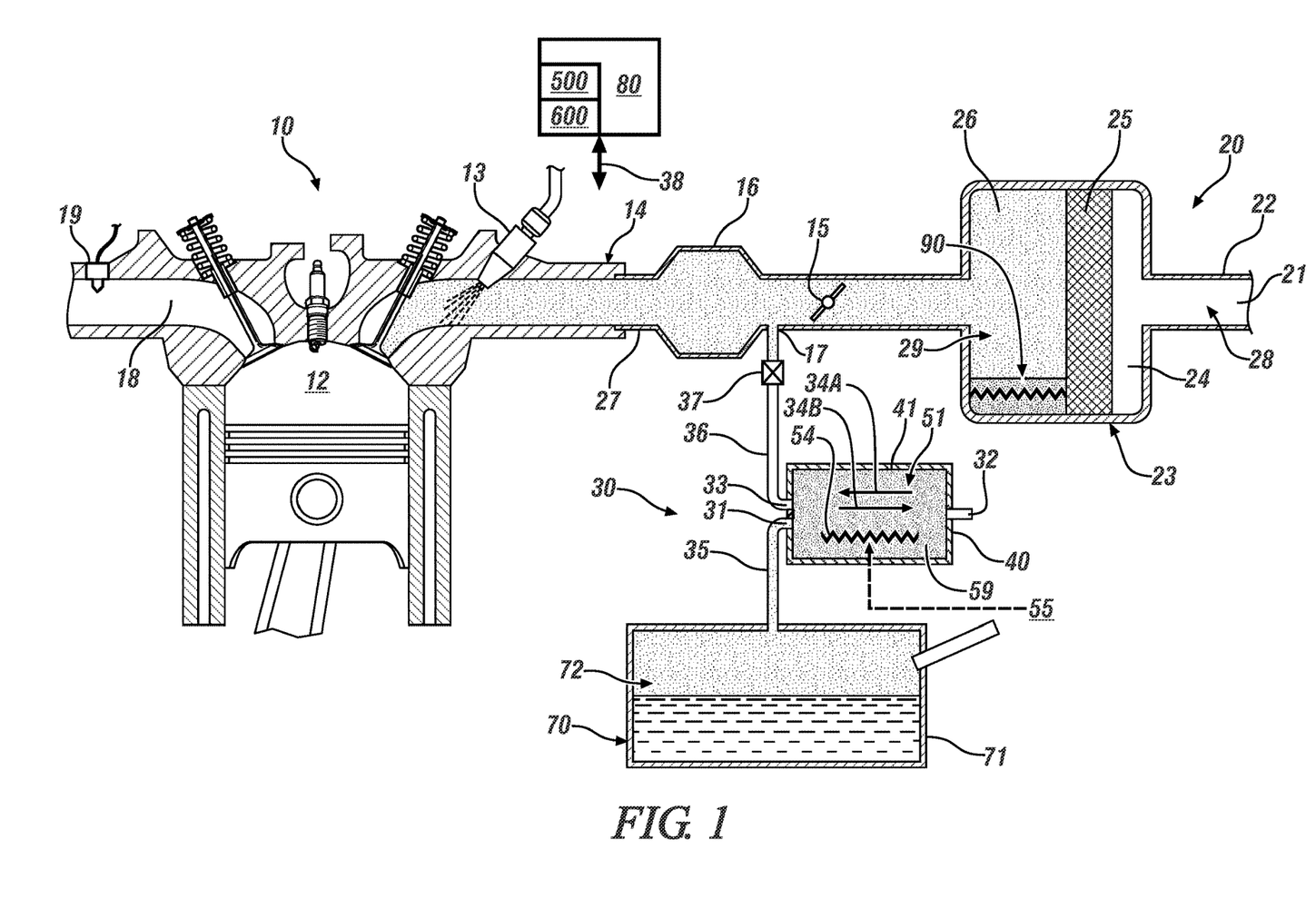
FIG. 1 schematically illustrates portions of an internal combustion engine and evaporative emissions system having an evaporative canister that contains a Metal Organic Framework (MOF) material, in accordance with the disclosure.

Referring to the drawings, wherein like reference numerals correspond to like or similar components throughout the several Figures, FIG. 1, consistent with embodiments disclosed herein, schematically illustrates a portion of a multi-cylinder internal combustion engine 10, fuel storage system 70, and an evaporative emission system 30 for a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The illustrated portion of the internal combustion engine 10 includes a single combustion chamber 12 that is fluidly coupled to an air intake system 20, an intake manifold 14, and an exhaust manifold 18. Elements of the internal combustion engine 10 include a fuel injector 13, throttle 15, air flow sensor 16, and exhaust sensor 19. The air intake system 20 includes a fresh air inlet 21 fluidly coupled to the intake manifold 14 via a fresh air duct 22, an air filter housing 23, and an intake manifold duct 27. The air filter housing 23 includes an inlet housing 24, an air filter element 25 and a filtered air housing 26. The fresh air inlet 21, fresh air duct 22, and inlet housing 24 of the air filter housing 23 form a fresh air side 28. The filtered air housing 26 of the air filter housing 23, the intake manifold duct 27, and the intake manifold 14 form a filtered air side 29. A vapor capture element 90 may be disposed in the filtered air housing 26 of the air filter housing 23 on the filtered air side 29 between the air filter element 25 and the intake manifold 14.

The internal combustion engine 10 as shown is configured as a spark-ignition internal combustion engine with port fuel injection. The concepts described herein are not limited to such a configuration, and may instead be employed on another form of fuel injection, such as but not limited to a direct-injection system. Furthermore, the concepts described herein may also be applied to a compression-ignition engine.

The fuel storage system 70 includes a fuel storage tank 71 that couples to an evaporative storage canister ("canister") 40 of the evaporative emission system 30. The fuel storage system 70 supplies fuel via a fuel pump to an engine fuel distribution system that fluidly couples to engine fuel injectors, including illustrated fuel injector 13. The fuel storage tank 71 is fluidly coupled to a first port 31 of the canister 40 via a vapor line 35. The canister 40 also includes a third port 33 that is fluidly coupled to the air intake system 20 via a purge line 36 and a purge valve 37. The purge line 36 is fluidly coupled to the air intake system 20 on the filtered air side 29 downstream of the throttle 15 at or near the intake manifold 14.

A controller 80 is arranged to control operation of the internal combustion engine 10, including controlling elements of the evaporative emission system 30. The controller 80 is in communication with or operatively connected to various elements via a communication link 38. The communication link 38 includes provides for transmission of data signals, which may include discrete, analog and/or digitized analog signals that represent inputs from sensors, actuator commands, and communication between controllers. This includes the controller 80 being in communication with and/or operatively connected to the canister 40, through which the controller 80 communicates control stimulus 55 (shown with reference to FIG. 1) or control stimuli 55, 56, 57 (shown with reference to FIG. 2) to a canister, e.g., canister 40. The controller 80 includes an evaporative emission system control algorithm ("control algorithm") 500 that is described with reference to FIG. 5, and an evaporative emission system monitoring algorithm ("monitoring algorithm") 600 that is described with reference to FIG. 6.

The canister 40 is arranged as a rigid container that forms and defines a first volumetric chamber 41 that contains a first adsorbent material 51 in one embodiment. The rigid container may be located in a fender well of the vehicle, or underhood, or another location on-vehicle, and is dimensionally configured based upon available space. The rigid container may be configured as a tubular device, a rectangular prismatic device, or another device. The canister 40 may include internal baffles and other structural elements for arranging the first adsorbent material 51 to prevent settling, etc. The canister 40 includes the first port 31, a second port 32, and the third port 33, and associated flow control valves for managing vapor flow under various operating conditions. The second port 32 is an air vent that vents to atmosphere. During an engine-off condition, air and vapor may flow from the head space 72 of the fuel storage tank 71 through the first port 31 and follow flowpath 34A through the first adsorbent material 51 to the second port 32 due to vapor pressure that is generated by heating of the fuel in the fuel storage tank 71. Advantageously, the vapor is adsorbed by the first adsorbent material 51 and only air is vented to the atmosphere. During operation of the engine 10, the purge valve 37 may be opened under predefined operating conditions, and air may flow through the second port 32 following flowpath 43B through the canister 40 due to negative pressure that is generated via the engine 10. The air flow desorbs the adsorbed fuel vapors from the first adsorbent material 51, thus serving to purge the canister 40.

In one embodiment, the first adsorbent material 51 is formed from a Metal Organic Framework (MOF) material that is capable of adsorbing and desorbing hydrocarbon material. In one embodiment, the first adsorbent material 51 is formed by arranging the MOF material with a binder material. In one embodiment, the first adsorbent material 51 is formed by depositing the MOF material onto a substrate. In one embodiment, the first adsorbent material 51 is the MOF material arranged as composite material may be in the form of beads, spheres, extruded or another shape that is poured into the chamber 41 and sealed therein. The MOF material is configured to adsorb fuel constituents including, e.g., n-butane, isobutane, n-pentane, and 2-methylbutane, and also adsorb oxygenates. In one embodiment, the first adsorbent material 51 is a MOF material having a pore width that ranges between 2 and 2.5 nm. In one embodiment, the first adsorbent material is a MOF material having a pore width that is less than 5 nm. Additional details related to MOF materials, pore widths, etc. are described with reference to FIG. 6. In one embodiment, the first adsorbent material 51 includes a MOF material is composed of metal coordination polymers having copper (Cu) acting as joints and benzene-1,3,5-tricarboxylate (BTC) ligand as the linkers, e.g., CuBTC.

In one embodiment, the first adsorbent material 51 is fabricated as a flexible Metal Organic Framework (MOF) material that is capable of adsorbing and desorbing hydrocarbon material in response to control stimulus 55. In one embodiment, the flexible MOF material is arranged with a binder material. In one embodiment, the flexible MOF material is deposited onto a substrate. In one embodiment, the flexible MOF material arranged as a composite material in the form of beads, spheres, extruded or another shape that is poured into the chamber 41 and sealed therein. In one embodiment, the flexible MOF material has a pore width that ranges between 2 and 2.5 nm. In one embodiment, the flexible MOF material has a pore width that is less than 5 nm. Additional details related to flexible MOF materials, pore widths, etc. are described with reference to FIGS. 3 and 4.

Flexible MOF materials are a class of MOF material that exhibits a dynamic change of pore dimensions in response to an external stimulus, wherein the change of pore dimensions is reversibly controllable to one of a first state or a second state, which may be provided by control stimulus, e.g., control stimulus 55. Flexible MOF material has the characteristics of framework flexibility and dynamic response, which distinguish it from other porous materials such as zeolites and activated carbons. In accordance with the construction natures and features, the flexible MOF material can show diverse types and magnitudes of structural dynamism. This many include a state change that include expansion and contraction of pore diameter, also known as a breathing mechanism. The breathing mechanism may be triggered by external chemical stimuli, e.g., guest adsorption, desorption, and exchange. The breathing mechanism may instead be triggered by external physical stimuli, e.g., a change in temperature, light, and/or pressure. Flexible MOF materials are configured to transform to have tightly arranged, small pores that are capable of adsorbing hydrocarbon vapor when the control stimulus 55 is in the first state. Volatile hydrocarbon vapor may precipitate onto and/or be adsorbed by the flexible MOF material of the first adsorbent material 51 during an engine-off state when controlled by the control stimulus 55 to the first state. The flexible MOF material is configured to transform to have loosely arranged, large pores capable of desorbing hydrocarbon vapor when the control stimulus 55 is in the second state. The hydrocarbon vapor that is adsorbed by the flexible MOF material 51 during an engine-off state may be desorbed by the flexible MOF material during an engine-on state when the flexible MOF material is controlled by the control stimulus 55 to the second state, e.g., during an evaporative purging event.

The breathing mechanism that is exhibited by the flexible MOF material in response to the control stimulus 55 can facilitate desorption of hydrocarbon vapors during a purge event, thus enabling faster purging of the canister 40 that is more complete, as compared to a canister that only employs activated carbon. Furthermore, flexible MOFs can store greater amount of hydrocarbon vapors than similarly sized (by volume) devices that employ activated carbon.

Referring again to FIG. 1, the controller 80 is operatively connected to the canister 40 via the control stimulus 55. The controller 80 generates the control stimulus 55 that is communicated to the canister 40. The control stimulus 55 includes a first state and a second state. The control stimulus 55 includes a first state and a second state, and may be a constant signal, a pulsewidth-modulated signal or another modulated signal in the form of electrical voltage, electrical current, electro-magnetic pulse, emitted light, pressure, etc., without limitation. In one embodiment, a controllable device 54 is integrated into the canister 40 or is arranged proximal to the canister 40, and is controlled in response to the control stimulus 55 to either the first state or the second state. In one embodiment, the controllable device 54 is an electrically-resistive substrate, e.g., formed from carbon on which the flexible MOF material 51 is deposited, and can be controlled to either an on state or an off state in response to the control stimulus 55 to control the canister 40. In one embodiment, the controllable device 54 is an electrically-powered heating element that is arranged proximal to the flexible MOF material 51, and can be controlled to either an on state or an off state in response to the control stimulus 55 to control the canister 40. In one embodiment, the controllable device 54 includes a first electrically-powered heating element that is arranged proximal to the flexible MOF material 51 and a second electrically-powered heating element that is arranged in the second port 32, i.e., the air vent, to heat incoming air during a purging event. The electrically-powered heating element(s) can be one of a positive temperature coefficient (PTC) heater, a thin film heater, or a rod heater.

A MOF sensor 59 monitors the flexible MOF material 51 and communicates with the controller 80. In one embodiment, the MOF sensor 59 is integrated to the canister 40. In one embodiment, the MOF sensor 59 is an electrical sensor in the controller 80 that monitors electrical resistance or conductance across all or a portion of the flexible MOF material 51. In one embodiment, the MOF sensor 59 is a differential pressure sensor that monitors a differential pressure across all or a portion of the flexible MOF material 51. In one embodiment, the MOF sensor 59 is a temperature sensor that monitors a temperature of the flexible MOF material 51. In one embodiment, the MOF sensor 59 includes multiple temperature sensors that monitor a differential temperature across all or a portion of the flexible MOF material 51.

The flexible MOF material may be one of or a combination of MIL-53 Al, MIL-88 series, ZIF-8, and/or Co(bdp). MIL-53 Al is an aluminum terephthalate MOF; MIL-88 series is an iron (III) dicarboxylate MOF; ZIF-8 is a zeolitic imidazolate framework that is made by zinc ions that are coordinated by four imidazolate rings; and Co(bdp) is a cobalt-based MOF with $bdp^{2-}$=1,4-benzenedipyrazolate linker.

Alternatively, the adsorbent material 40 stored in the chamber 41 of canister 40 may be composed to include two or three or more adsorbent materials that are intermixed. The adsorbent materials may be composed to include one or more of a MOF material having a pore width that ranges between 2.5 nm and 5 nm, or a MOF material having a pore with that is less than 5 nm, a MOF material having a pore width that ranges between 10 nm and 40 nm, a flexible MOF material, an activated charcoal material, etc. Various combinations of adsorbent materials may be selected and employed to accomplish the task of capturing, storing, and releasing fuel vapor constituents.

Figure 2:
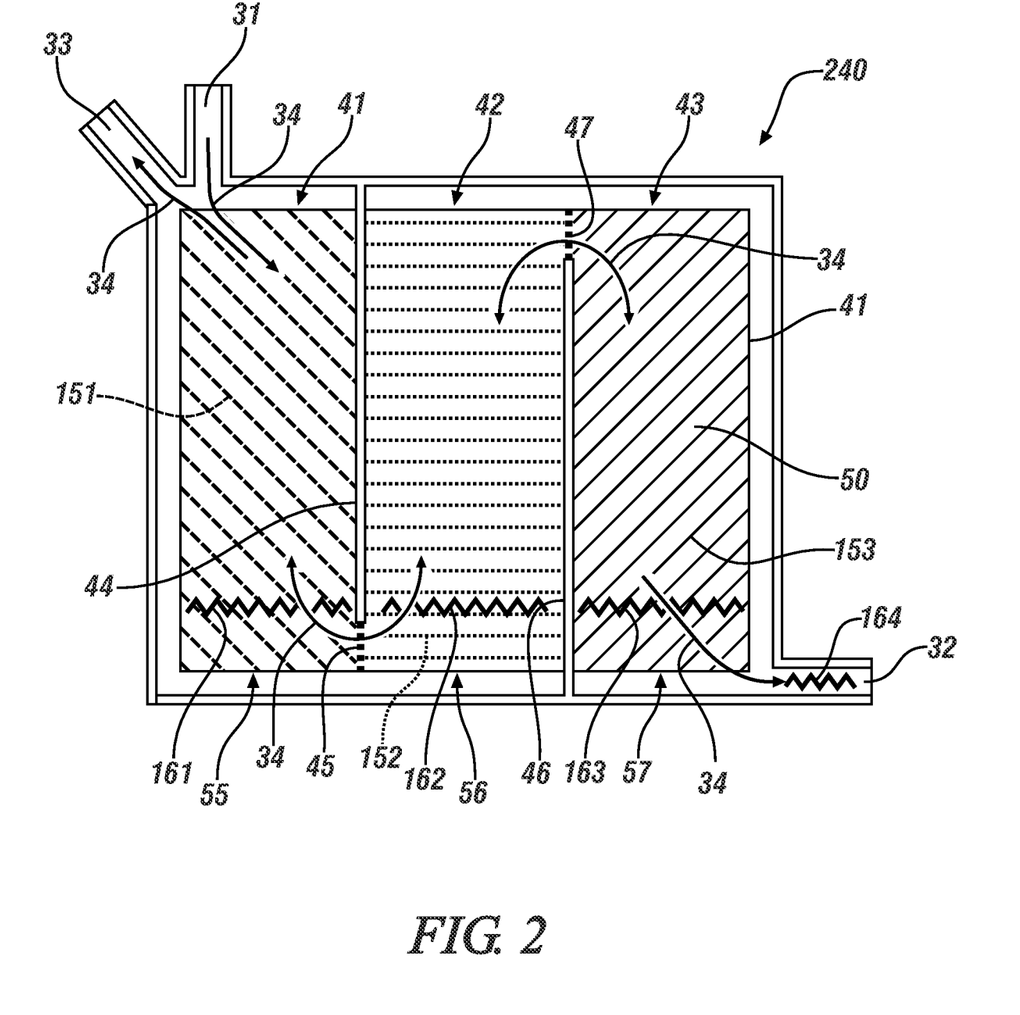
FIG. 2 schematically illustrates an embodiment of an evaporative canister including a plurality of chambers arranged in series, in accordance with the disclosure.

FIG. 2 schematically illustrates an alternative embodiment of the canister 240 that can be employed on an embodiment of the vehicle and internal combustion engine 10 described with reference to FIG. 1. In this embodiment, the canister 240 is arranged as a rigid container having a rectangular prismatic shape that forms and defines a plurality of chambers that are arranged in series between the first port 31 and the second port 32. In one embodiment, and as described herein, the canister 240 includes the first volumetric chamber 41 arranged in series with a second volumetric chamber 42, which is arranged in series with a third volumetric chamber 43, which is fluidly coupled on one end to the second port 32. In one embodiment, and as shown, the first volumetric chamber 41, the second volumetric chamber 42 and the third volumetric chamber 43 are arranged as rectangular prismatic structures that are arranged side-by-side, with the first volumetric chamber 41 being separated from the second volumetric chamber 42 by a first separator 44, and with the second volumetric chamber 42 being separated from the third volumetric chamber 43 by a second separator 46. The first separator 44 has a first screen 45 on a first end, and the second separator 46 has a second screen 47 on a second, opposed end. The arrangement facilitates a flowpath 34 through the canister 240 between the first port 31 and the second port 32 that passes through the first volumetric chamber 41, the second volumetric chamber 42 and the third volumetric chamber 43 in series.

The first volumetric chamber 41 is filled with first adsorbent material 151, the second volumetric chamber 42 is filled with a second adsorbent material 152, and the third volumetric chamber 43 is filled with a third adsorbent material 153. The first volumetric chamber 41 also houses a first actuator 161 that is controlled by a first control stimulus 55. The second volumetric chamber 42 also houses a second actuator 162 that is controlled by a second control stimulus 56. The third volumetric chamber 43 also houses a third actuator 163 that is controlled by a third control stimulus 57. In one embodiment, a fourth actuator 164 is arranged in the second port 32, and controlled by a fourth control stimulus 58. The first actuator 161, the second actuator 162, the third actuator 163 and the fourth actuator 164 (when used) are analogous to the controllable device 54 that is described with reference to FIG. 1, and the first control stimulus 55, the second control stimulus 56, the third control stimulus 57 and the fourth control stimulus 58 (when used) are analogous to the control stimulus 55 that is described with reference to FIG. 1.

The first adsorbent material 151 may be analogous to the first adsorbent material 51 that has been described with reference to FIG. 1, which is a MOF material having a pore width that ranges between 2.5 nm and 5 nm in one embodiment, or having a pore with that is less than 5 nm in one embodiment. Alternatively, the first adsorbent material 151 is a flexible MOF material that is controlled by first control stimulus 55. Alternatively, the first adsorbent material 151 is an activated carbon material.

The second adsorbent material 152 is a MOF material having a pore width that ranges between 10 nm and 40 nm in one embodiment. Alternatively, the second adsorbent material 152 is a MOF material that is configured to adsorb oxygenated fuel vapor constituents including ethanol. Alternatively, the second adsorbent material 152 is a flexible MOF material that is controlled by second control stimulus 56. Alternatively, the second adsorbent material 152 is an activated carbon material.

The third adsorbent material 153 is an activated charcoal material in one embodiment. Alternatively, the third adsorbent material 153 is a flexible MOF material that is controlled by third control stimulus 57.

The controller 80 is operatively connected to the canister purge valve 37 and the first, second, and/or third, and/or fourth control stimuli 55, 56, 57, 58 when employed. The controller 80 generates the first, second, and/or third, and/or fourth control stimuli 55, 56, 57, 58. Each of the first, second, and/or third, and/or fourth control stimuli 55, 56, 57, 58 includes a first state and a second state. The control stimuli 55, 56, 57 may be one of or a combination of a partial pressure, an ambient temperature, or a light intensity, or an electrical signal, or an electro-magnetic signal. In one embodiment, the first, second, and/or third, and/or fourth control stimuli 55, 56, 57, 58 are in the form of control signals that may be actively generated by the controller 80. In such embodiments, the first, second, and/or third, and/or fourth control stimuli 55, 56, 57, 58 may be constant or modulated electrical voltage or current signals, or electromagnetic signals. In one embodiment, the control stimuli 55, 56, 57 may be indirectly generated by one or more engine operating conditions and/or vehicle operating conditions. In such embodiments, the control stimuli 55, 56, 57 may be one or a combination of a partial pressure, or an ambient temperature, or a light intensity.

Figure 3:
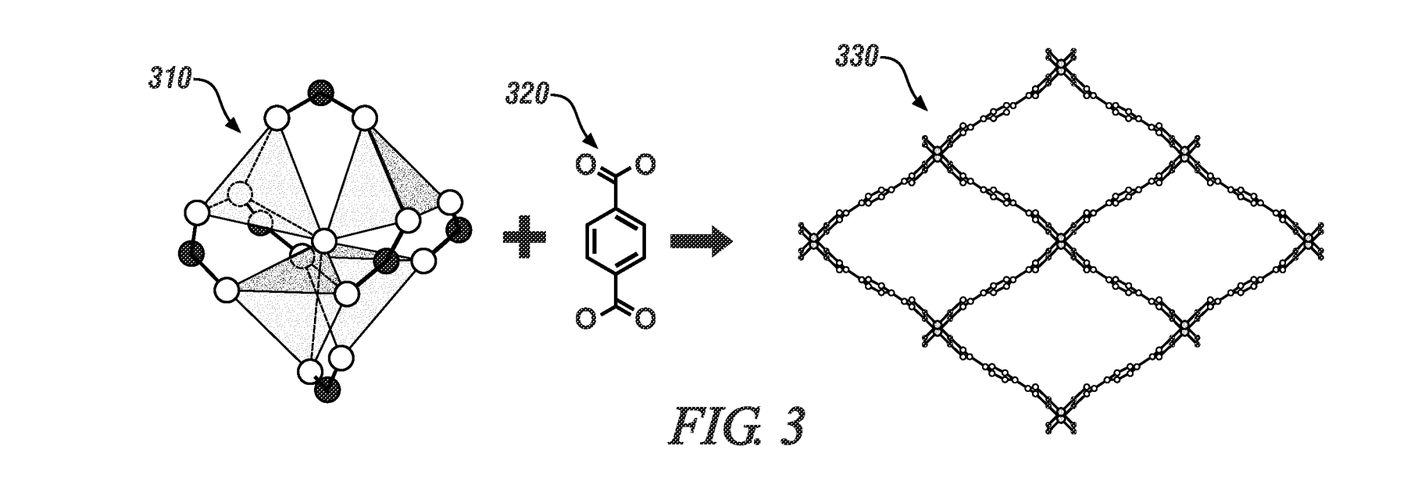
FIG. 3 pictorially shows an example flexible MOF material, in accordance with the disclosure.

FIG. 3 pictorially shows an example of a flexible MOF 330. The flexible MOF 330 is a hybrid organic-inorganic material that is assembled by connection of Secondary Building Blocks (SBU) 310 through rigid organic ligands 320. In one embodiment, the SBU 310 includes metal oxide clusters. The flexible MOF 330 may also be described as having interchangeable metal-containing nodes and carbon-based struts. Pore sizes and their chemical functionality can be tailored through control of the architecture, including being tailored to adsorb specific hydrocarbon molecules.

Figure 4:
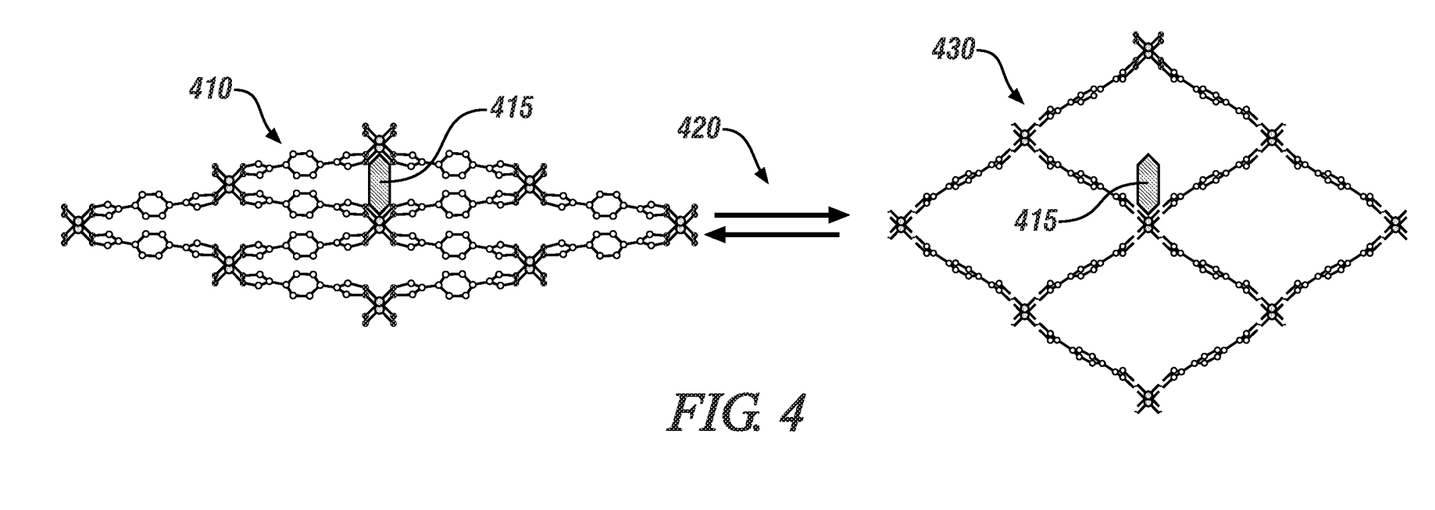
FIG. 4 pictorially illustrates a portion of an example flexible MOF material in a first, collapsed state and in a second, expanded state, and an associated control stimulus, in accordance with the disclosure.

FIG. 4 pictorially illustrates a portion of an embodiment of the flexible MOF material, e.g., Co(bdp), in a first, collapsed state 410 and in a second, expanded state 430, and an associated control stimulus 420. The flexible MOF material is reversibly controllable to the first, collapsed state 410 and the second, expanded state 430 in response to the control stimulus 420. As illustrated, the flexible MOF material is transformable to have tightly arranged, small pores that are capable of adsorbing hydrocarbon vapor when commanded to the first, collapsed state 410 by the control stimulus 420. As illustrated, the flexible MOF material is transformable to have loosely arranged, large pores that are capable of desorbing hydrocarbon vapor when commanded to the second, expanded state 430 by the control stimulus 420. A sensor 415 is arranged to monitor the flexible MOF material. The sensor 415 may be a position sensor, or an electrical continuity sensor, or another device capable of detecting whether the flexible MOF material is in the first, collapsed state 410 or in the second, expanded state 430, for purposes of control and diagnostics.

Referring again to FIG. 1, the vapor capture element 90 is a flexible Metal Organic Framework (MOF) material that is reversibly controllable in a first state and a second state in response to a control stimulus, in one embodiment. Alternatively, the vapor capture element 90 is a Metal Organic Framework (MOF) material.

Known compositions of gasoline fuel are a combination of alkanes ($C_4$-$C_{12}$) and aromatics (alkylbenzenes, indanes, naphthalenes) in the boiling range of approximately 35-200° C., and one or more oxygenates such as ethanol. In terms of blend compositions, gasoline may contain 55-77% saturated hydrocarbons, 9-36% aromatics, some unsaturated hydrocarbons and 10-15% ethanol. Gasoline vapor contains very volatile organic compounds (VVOCs), with n-butane, isobutane, n-pentane and 2-methylbutane collectively accounting for 60-77 wt %. The most abundant alkane in evaporated gasoline is n-butane. Headspace compositions can be predicted using the fuel's composition, vapor-liquid equilibrium theory and activity coefficients.

Figure 5:
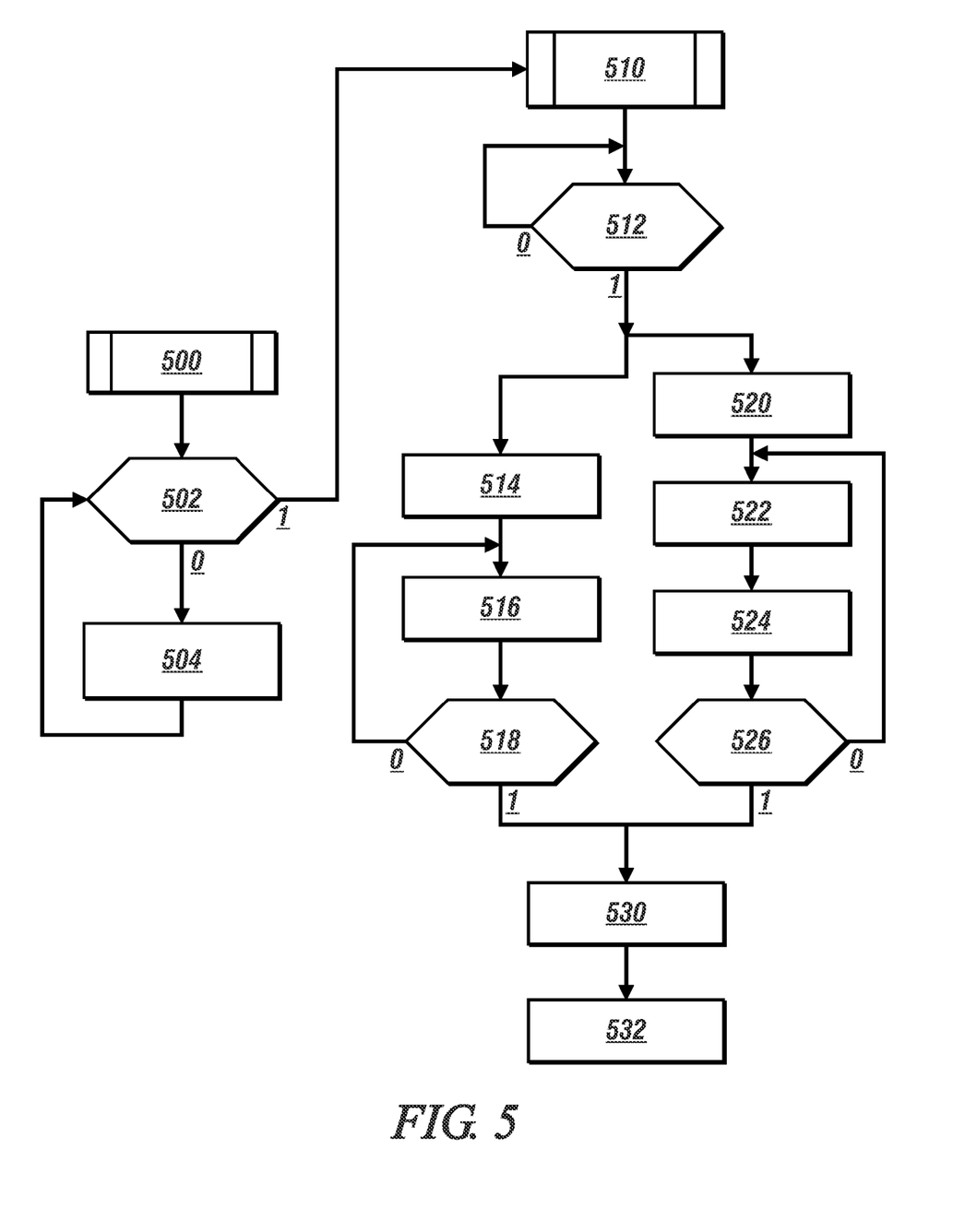
FIG. 5 schematically illustrates a flowchart of an evaporative emission system control algorithm for controlling an embodiment of the internal combustion engine and evaporative emissions system that is described with reference to FIG. 1, in accordance with the disclosure.

FIG. 5 schematically illustrates a flowchart of an evaporative emission system control algorithm ("control algorithm") 500, executable in the controller 80, for controlling an embodiment of a vehicle that includes an embodiment of the internal combustion engine 10 and evaporative emission system 30 that are described with reference to FIG. 1. The evaporative emission system 30 includes a canister 40 that is arranged to capture fuel vapors from fuel storage system 70 and is fluidly coupled via purge valve 37 to intake manifold 14 of the internal combustion engine 10. The canister 40 has the first adsorbent material 51 in the form of MOF material disposed in the chamber 41. In one embodiment, the MOF material 41 disposed in the chamber is a flexible MOF material, e.g., as described herein. A controllable device, e.g., controllable device 54 is coupled to the MOF material. The controller 80 is operatively connected to the controllable device 54 and the purge valve 37. The controller 80 includes an instruction set in the form of the control algorithm 500 that is executable to activate the controllable device 54 and control the purge valve 37 in response to a command to purge the canister 40. The control algorithm 500 further includes determining an activation parameter for the controllable device 54, determining a purge flow and a total purge mass, and deactivating the controllable device when the total purge mass is greater than a threshold. The activation parameter for the controllable device 54 corresponds to the control stimulus 55.

As appreciated, the concepts described herein also apply to embodiments of the internal combustion engine 10 and evaporative emission system 30 that are described with reference to FIG. 1 that employ an embodiment of the canister 240 that is described with reference to FIG. 2 to capture fuel vapors from fuel storage system 70 and is fluidly coupled via purge valve 37 to intake manifold 14 of the internal combustion engine 10.

Details of the control algorithm 500 include as follows. The control algorithm 500 monitors vehicle operation to detect occurrence of a key-on event, i.e., some indication by a vehicle operator that they intend to operate the vehicle (502). If there is no key-on event (502)(0), the controllable device 54 and hence the first adsorbent material 51 including the MOF material are controlled to the first state via the control stimulus 55 (504) to facilitate hydrocarbon adsorption by the first adsorbent material 51. In response to a key-on event (502)(1), a canister purge routine 510 is executed. The first step of the canister purge routine 510 is to determine whether a canister purge event is enabled (512). This includes, by way of non-limiting examples, evaluating operation of the internal combustion engine 10 to determine if it is able to manage operation with a flow of additional hydrocarbons originating from the canister 40. Such evaluation can include determining that the engine 10 is in a warmed up condition, determining that an exhaust aftertreatment system is capable of managing additional hydrocarbons, etc. Purge enable criteria and associated engine operating criteria are system-specific and are known.

When the purge enable criteria are met (512)(1), the purge valve 37 is activated to enable flow (520), and the control stimulus 55 commands operation of controllable device 54 to control the first adsorbent material 51 including the MOF material to the second state (514) to facilitate hydrocarbon desorption therefrom. After activating the purge valve 37, engine operation is monitored to estimate a purge flowrate (522), and an integrated purge mass is determined by executing a time-integration of the estimated purge flowrate (524). The integrated purge mass is compared to a threshold purge mass (526). Alternatively, the estimated purge flowrate can be used to determine a purge volume, and compared to a threshold purge volume.

Coincidently, the control stimulus 55 is monitored to estimate or otherwise determine a magnitude of activation energy that is input to the MOF material, which is integrated over time (516). The time-integrated magnitude of activation energy input to the MOF material is compared to an energy threshold (518). This operation continues while both the integrated purge mass is less than the threshold purge mass (526)(0) and the time-integrated magnitude of activation energy input to the MOF material is less than the energy threshold (518)(0). When either the integrated purge mass is greater than the threshold purge mass (526)(1) or the time-integrated magnitude of activation energy input to the MOF material is greater than the energy threshold (518)(1), the control stimulus 55 commands operation of controllable device 54 to control the first adsorbent material 51 including the MOF material to the first state (530). The purge valve 37 continues to be activated to permit flow through the canister 40 during the key-on event, unless other factors cause it to be deactivated.

In one embodiment, the controllable device 54 is a heating element, with active heating being commanded in the first state and with no heating being commanded in the second state.

Figure 6:
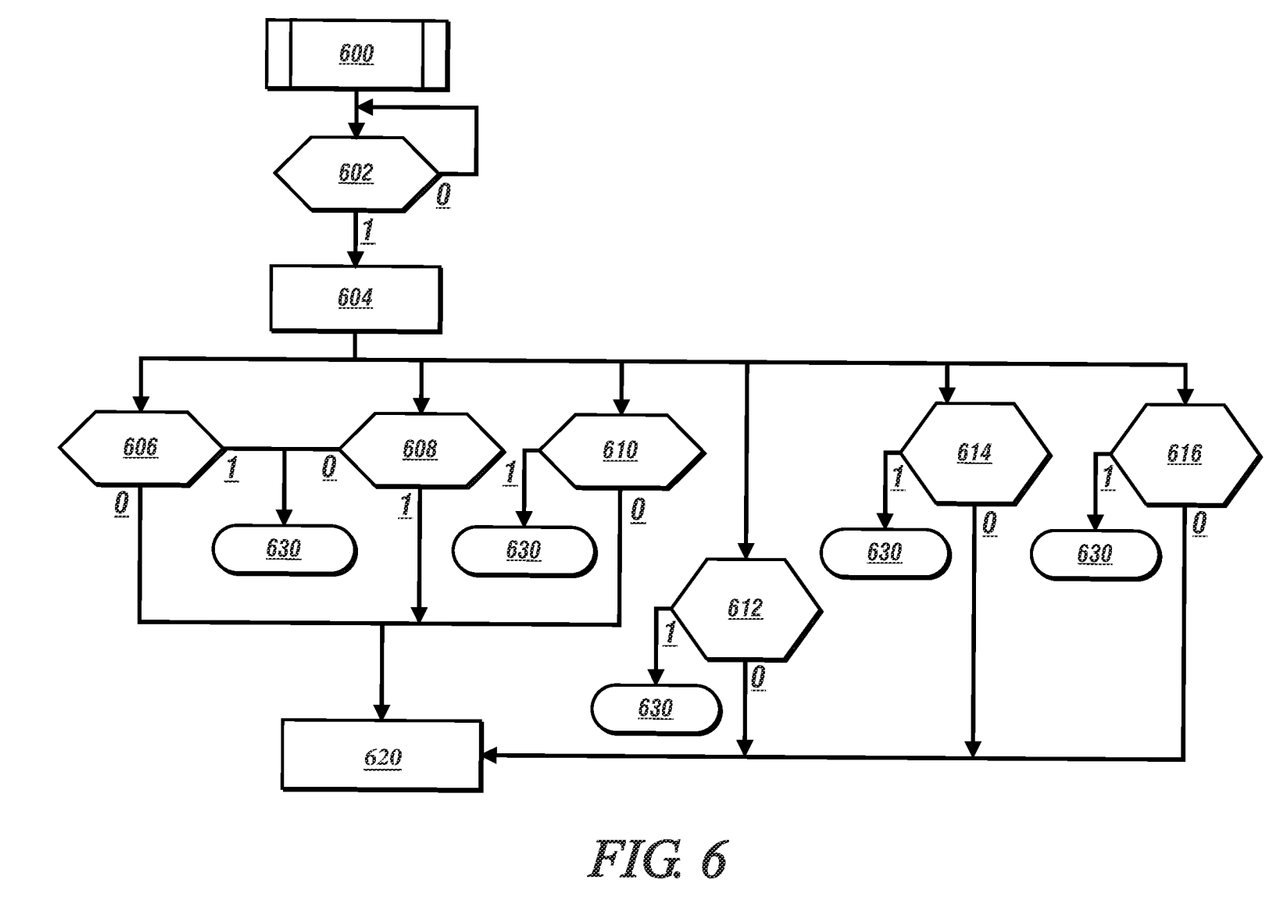
FIG. 6 schematically illustrates a flowchart of an evaporative emission system monitoring algorithm for monitoring an embodiment of the internal combustion engine and evaporative emissions system that is described with reference to FIG. 1, in accordance with the disclosure.

FIG. 6 schematically illustrates a flowchart of an evaporative emission system monitoring algorithm ("monitoring algorithm") 600 that is executable in the controller 80 to monitor an embodiment of vehicle that includes an embodiment of the internal combustion engine 10 and evaporative emission system 30 that are described with reference to FIGS. 1, 2, and 4. The monitoring algorithm 600 seeks to detect occurrence of a fault in the evaporative emission system 30 including an embodiment of the canister 40 that is arranged to capture fuel vapors from fuel storage system 70 and is fluidly coupled via purge valve 37 to intake manifold 14 of the internal combustion engine 10. The canister 40 has the first adsorbent material 51 in the form of MOF material disposed in the chamber 41. In one embodiment, the MOF material 41 disposed in the chamber is a flexible MOF material, e.g., as described herein. The controllable device, e.g., device 54 is coupled to the MOF material. The controller 80 is operatively connected to the controllable device and the purge valve 37, and in communication with various sensors via the communication link 38. The controller 80 includes an instruction set in the form of the monitoring algorithm 600.

Details of the monitoring algorithm 600 include as follows. The monitoring algorithm 600 executes during engine operation when enable criteria have been met (602)(1). Enable criteria can include achieving selected states for engine operating parameters, absence of related faults, and other criteria. When the enable criteria are not met (602)(0), execute of the monitoring algorithm 600 is postponed.

The monitoring algorithm 600 includes regular and/or periodic monitoring of inputs from on-vehicle sensors, timers, control routines, etc. (604). It is appreciated that one or more of the on-vehicle sensors may be replaced with an estimation model to determine the desired parameter. The inputs include, e.g., signal inputs from the control stimulus 55, the control signal to the purge valve 37, engine operation from the exhaust sensor 19, position sensor 415 that is arranged to monitor the flexible MOF material, MOF sensors 59, etc.

The monitoring algorithm 600 includes executing a plurality of diagnostic monitoring algorithms to evaluate elements of the evaporative emission system 30, the canister 40, and the internal combustion engine 10. Exemplary diagnostic monitoring algorithms include a power rationality check 606, an open circuit/short circuit check 608, a device position rationality check 610, a MOF parameter check 612, a purge rationality check 614, and/or a vapor flow rationality check 616.

The power rationality check 606 indicates whether the power consumed by the control stimulus 55, integrated over its operation, is within an allowable maximum and minimum power range. The allowable maximum and minimum power range is associated with expected power needs to purge the canister 40 of hydrocarbon vapor by activation of the flexible MOF material via the control stimulus 55. The power rationality check 606 indicates absence of a fault associated with power consumed by the control stimulus 55 (630) when the integrated power is within the allowable maximum and minimum power range (606)(1). The power rationality check 606 indicates occurrence of a fault (620) when the integrated power is outside the allowable maximum and minimum power range (606)(0).

The open circuit/short circuit check 608 an electrical check of the elements of the communication link 38 that are related to actuators and sensors employed by the evaporative emission system 30, including, e.g., the purge valve 37, the control stimulus 55, etc. The electrical check of the elements of the communication link 38 include a check for occurrence of short circuits or open circuits. The open circuit/short circuit check 608 indicates absence of a short circuit fault or an open circuit fault (630) when no short circuits or open circuits in the communication link 38 are detected (608)(1). The open circuit/short circuit check 608 indicates a potential occurrence of a fault (620) when either a short circuit or an open circuit in the communication link 38 is detected (608)(0).

The device position rationality check 610 monitors the signal input from the position sensor 415 that integrated into the flexible MOF material to determine whether the flexible MOF material is in a position that is consistent with the command position as indicated by the control stimulus 55. For example, when the control stimulus 55 commands the flexible MOF material to the first state, the position sensor 415 indicates that the flexible MOF material has tightly arranged, small pores that are capable of adsorbing hydrocarbon vapor. When the control stimulus 55 commands the flexible MOF material to the second state, the position sensor 415 indicates that the flexible MOF material has large pores that are capable of desorbing hydrocarbon vapor. The device position rationality check 610 indicates absence of a fault associated with position of the flexible MOF material (630) when the position sensor 415 indicates the flexible MOF material is in a position that is consistent with the command position as indicated by the control stimulus 55 (610)(1). The device position rationality check 610 indicates a potential occurrence of a fault (620) when the position sensor 415 indicates the flexible MOF material is in a position that is inconsistent with the command position as indicated by the control stimulus 55 (610)(0).

The MOF parameter check 612 monitors one or multiple inputs from sensor(s), and associated models, to determine a MOF parameter that is associated with structural or electrical integrity of the flexible MOF material 51 in the canister 40. As described with reference to FIG. 1, MOF sensor 59 may be an electrical sensor that is arranged to monitor electrical conductance or electrical resistance across the flexible MOF material during the purge event. Alternatively, MOF sensor 59 may be a differential pressure sensor arranged to monitor a pressure drop across the flexible MOF material during the purge event. Alternatively, MOF sensor 59 may be a temperature sensor arranged to monitor a temperature of the flexible MOF material during the purge event. Alternatively, MOF sensor 59 may include multiple temperature sensors arranged to monitor a temperature gradient of the flexible MOF material during the purge event. The MOF parameter check 612 indicates absence of a fault associated with the structural or electrical integrity of the flexible MOF material (630) when a parameter associated with a signal output from the MOF sensor 59 is within a predetermined calibrated range (612)(1). The MOF parameter check 612 indicates a potential occurrence of a fault (620) when the MOF sensor 59 indicates the flexible MOF material is outside the predetermined calibrated range (612)(0).

The purge rationality check 614 monitors a time associated with a purge event in one embodiment. Purge time relates to an expected amount of time that is necessary to purge the canister 40 and may be related to feedback from the WRAF sensor 19 or other information. A purge time fault may indicate a broken or plugged purge line, a leak in the system, a fault or degradation in the flexible MOF material, etc. The purge rationality check 614 indicates absence of a fault associated with the evaporative system 30 (630) when the purge time is within a predetermined calibrated time range (614)(1). The purge rationality check 614 indicates a potential occurrence of a fault (620) when the purge time is outside the predetermined calibrated time range (614)(0).

The vapor flow rationality check 616 monitors a parameter associated with engine air/fuel ratio control using feedback from the exhaust sensor 19 during a purge event in one embodiment. The parameters associated with engine air/fuel ratio control relate to an expected adjustment to engine air/fuel ratio control to compensate for flow of hydrocarbon vapor from the canister 40 during the purge event. The vapor flow rationality check 616 may indicate a broken or plugged purge line, a leak in the system, a fault or degradation in the flexible MOF material, etc. The vapor flow rationality check 616 indicates absence of a fault associated with the evaporative system 30 (630) when the parameter associated with engine air/fuel ratio control is within a predetermined calibrated time range (616)(1). The vapor flow rationality check 616 indicates a potential occurrence of a fault (620) when the purge time is outside the predetermined calibrated time range (616)(0).

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A vehicle system, comprising:
an internal combustion engine;
evaporative emission system including a canister, the canister arranged to capture fuel vapors from a fuel tank and fluidly coupled via a purge valve to an intake portion of the internal combustion engine;
the canister defining a chamber, and having a flexible Metal Organic Framework (MOF) material disposed in the chamber;
a controllable device coupled to the flexible MOF material; and
a controller, operatively connected to the controllable device and the purge valve, the controller including an instruction set, the instruction set executable to:
activate the controllable device and control the purge valve to an open state in response to a command to purge the canister,
determine an activation parameter for the controllable device,
determine a purge flow and a total purge mass, and
deactivate the controllable device when the total purge mass is greater than a threshold.

2. The vehicle system of claim 1, further comprising the instruction set executable to deactivate the controllable device when the activation parameter for the controllable device is greater than a second threshold.

3. The vehicle system of claim 1, wherein the controllable device coupled to the flexible MOF material comprises a first heating element that is arranged proximal to the flexible MOF material, wherein the instruction set being executable to activate the controllable device comprises the instruction set being executable to control the controllable device in a heat generating state.

4. The vehicle system of claim 3, wherein the first heating element comprises one of a positive temperature coefficient (PTC) heater, a thin film heater, or a rod heater.

5. The vehicle system of claim 3, wherein the controllable device includes a second heating element arranged in a flow stream proximal to an air vent of the canister, wherein the controller is operative to activate the second heating element in response to the command to purge the canister.

6. The vehicle system of claim 1, wherein the flexible Metal Organic Framework (MOF) material disposed in the chamber of the canister comprises a hybrid organic-inorganic material that is assembled by connection of metal oxide clusters through rigid organic ligands, wherein the flexible MOF material is reversibly controllable in one of a first, collapsed state and a second, expanded state in response to a control stimulus, and wherein the control stimulus corresponds to the activation parameter for the controllable device.

7. The vehicle system of claim 1, wherein the controller is operable to integrate the activation parameter to determine an integrated activation energy parameter for the controllable device; and
wherein the controller is operative to detect a fault associated with the controllable device when the integrated activation energy parameter for the controllable device is either greater than an upper threshold or less than a lower threshold.

8. The vehicle system of claim 1, further comprising a sensing element that is arranged to monitor an element of the evaporative emission system and is in communication with the controller; and further comprising the instruction set being executable to monitor the sensing element to detect a fault associated with the evaporative emission system.

9. The vehicle system of claim 8, comprising the sensing element being arranged to monitor an electrical circuit of the evaporative emission system, and wherein the instruction set is executable to detect one of an open circuit or a short circuit in the electrical circuit of the evaporative emission system.

10. The vehicle system of claim 8, comprising the sensing element being arranged to monitor a position associated with the flexible Metal Organic Framework (MOF) material disposed in the canister, and wherein the instruction set is executable to detect a fault in the flexible MOF material based upon the position.

11. The vehicle system of claim 8, comprising the sensing element being arranged to monitor a temperature associated with the flexible MOF material disposed in the canister, and wherein the instruction set is executable to detect a fault in the flexible MOF material based upon the temperature.

12. The vehicle system of claim 8, comprising the sensing element being arranged to monitor a pressure associated with the flexible MOF material disposed in the canister, and wherein the instruction set is executable to detect a fault in the flexible MOF material based upon the pressure.

13. The vehicle system of claim 8, comprising the sensing element being arranged to monitor a purge time associated with the evaporative emission system, and wherein the instruction set is executable to detect a fault in the flexible MOF material based upon the purge time.

14. A vehicle system, comprising:
an internal combustion engine;
evaporative emission system including a canister, the canister arranged to capture fuel vapors from a fuel tank and fluidly coupled via a purge valve to an intake portion of the internal combustion engine;
the canister defining a first chamber and a second chamber, the first chamber and the second chamber being arranged in series between a vent valve and a purge valve,
the first chamber having a first Metal Organic Framework (MOF) material and a first controllable device arranged therein;
the second chamber having a second MOF material and a second controllable device arranged therein;
a controller, operatively connected to the first controllable device, the second controllable device, and the purge valve;
the controller including an instruction set, the instruction set executable to:
activate the first controllable device, deactivate the second controllable device, and control the purge valve to an open state in response to a command to purge the canister, determine a first activation parameter for the first controllable device, deactivate the first controllable device, activate the second controllable device, and control the purge valve to the open state when the first activation parameter for the first controllable device is greater than a first threshold;

determine a second activation parameter for the second controllable device;

determine a purge flow, integrate the purge flow to determine a total purge mass, and deactivate the second controllable device when the total purge mass is greater than a threshold.

15. A method for operating an on-vehicle evaporative emission system including a canister, the canister arranged to capture fuel vapors from a fuel tank and fluidly coupled via a purge valve to an intake portion of an internal combustion engine, wherein the canister defines a chamber having a flexible Metal Organic Framework (MOF) material disposed therein the chamber, the method comprising:

controlling the purge valve to an open state in response to a command to purge the canister;

activating a controllable device coupled to the flexible MOF material;

determining an activation parameter for the controllable device, determining a purge flow, integrating the purge flow to determine a total purge mass, and deactivating the controllable device when the total purge mass is greater than a threshold.

16. The method of claim 15, further comprising deactivating the controllable device when the activation parameter for the controllable device is greater than a second threshold.

17. The method of claim 15, wherein the controllable device includes a first heating element that is arranged proximal to the flexible MOF material, wherein the method further comprises controlling the controllable device in a heat generating state.

18. The method of claim 15, further comprising a second heating element arranged in a flow stream proximal to an air vent of the canister, the method further comprising activating the second heating element in response to the command to purge the canister.

19. The method of claim 15, comprising integrating the activation parameter to determine an integrated activation energy parameter for the controllable device; and detecting a fault associated with the controllable device when the integrated activation energy parameter for the controllable device is either greater than an upper threshold or less than a lower threshold.

20. The method of claim 15, further comprising monitoring a sensing element arranged to monitor an element of the evaporative emission system to detect a fault associated with the evaporative emission system.

* * * * *